US010472779B2

(12) United States Patent
Schmidt et al.

(10) Patent No.: US 10,472,779 B2
(45) Date of Patent: Nov. 12, 2019

(54) ROAD FINISHER WITH LIFTABLE CHASSIS

(71) Applicant: JOSEPH VOEGELE AG, Ludwigshafen/Rhein (DE)

(72) Inventors: Thomas Schmidt, Plankstadt (DE); Martin Seibel, Bruchsal (DE); Martin Buschmann, Neustadt (DE); Tobias Gotterbarm, Neuhofen (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 16/217,179

(22) Filed: Dec. 12, 2018

(65) Prior Publication Data

US 2019/0177928 A1 Jun. 13, 2019

(30) Foreign Application Priority Data

Dec. 13, 2017 (EP) .................................... 17206925

(51) Int. Cl.
*E01C 19/48* (2006.01)

(52) U.S. Cl.
CPC .......... *E01C 19/4873* (2013.01); *E01C 19/48* (2013.01); *B60G 2300/09* (2013.01); *B60G 2300/32* (2013.01); *B60G 2500/324* (2013.01); *E01C 2301/00* (2013.01)

(58) Field of Classification Search
CPC .. E01C 19/4873; E01C 19/48; E01C 2301/00; B60G 2300/09; B60G 2300/32; B60G 2300/324
USPC .................... 404/2, 75, 84.05–84.5, 101, 118
See application file for complete search history.

(56) References Cited

U.S. PATENT DOCUMENTS

| 3,901,616 | A | 8/1975 | Greening |
| 4,801,218 | A | 1/1989 | Musil |
| 7,503,412 | B2 * | 3/2009 | Francois ................. E01C 19/48 |
| | | | 180/9.5 |

FOREIGN PATENT DOCUMENTS

| EP | 0 849 398 A1 | 6/1998 |
| EP | 0849398 B1 | 9/2003 |

OTHER PUBLICATIONS

European Search Report dated Apr. 24, 2018, Application No. EP 17206925.4, 5 Pages.

(Continued)

*Primary Examiner* — Raymond W Addie
(74) *Attorney, Agent, or Firm* — Brooks Kushman P.C.

(57) ABSTRACT

A road finisher including an undercarriage, a chassis, a hopper, a paving screed, and a lifting device for lifting the chassis relative to the undercarriage at least in a rear region of the road finisher. The lifting device comprises a rocker mounted rotatably around an undercarriage rotational axis at an undercarriage-side bearing surface and rotatably around a chassis rotational axis at a chassis-side bearing surface. The lifting device further comprises a length-variable adjustment member connecting a chassis-side link point to a rocker-side link point and configured to change a distance between the chassis-side link point and the rocker-side link point by changing its length to selectively lift or lower the chassis relative to the undercarriage. A distance between the chassis rotation axis and the undercarriage rotation axis is greater than a distance between the chassis rotation axis and the chassis-side bearing surface.

20 Claims, 4 Drawing Sheets

(56) References Cited

OTHER PUBLICATIONS

Bomag Fayat Group, CR600 Series Pavers & MTV, www.bomag.com/us, CR600MTV2015 Feb. 2015, 16 Pages.

* cited by examiner

ROAD FINISHER WITH LIFTABLE CHASSIS

CROSS-REFERENCE TO RELATED APPLICATIONS

This application claims foreign priority benefits under 35 U.S.C. § 119(a)-(d) to European patent application number EP 17206925.4, filed Dec. 13, 2017, which is incorporated by reference in its entirety.

TECHNICAL FIELD

The present disclosure relates to road finishers with a chassis that can be lifted in relation to the undercarriage at least in a rear region of the road finisher.

BACKGROUND

Known road finishers include a hopper at the front of the road finisher with respect to the paving direction to accommodate paving material. During paving, the paving material is conveyed from the hopper to the rear of the road finisher via a suitable longitudinal conveyor. There, a spreading auger distributes the paving material transverse to the paving direction, thus feeding it evenly to a paving screed pulled behind by the road finisher for compacting the paving material. It is known from practice to attach the spreading auger to the road finisher chassis in a height-adjustable manner. By adjusting the height of the spreading auger relative to the chassis, the road finisher can be adapted for paving different layer thicknesses. For example, the spreading auger can be lifted relative to the chassis to pave thicker layers.

A disadvantage of such a system is that for paving very thick layers the position of the auger relative to the chassis is significantly changed upwards. This can lead to a situation where the spreading auger at least partially blocks a material outlet of the longitudinal conveyor. This reduces the throughput of paving material to the paving screed, which is particularly disadvantageous with large layer thicknesses, as these require an increased quantity of paving material.

From EP 0 849 398 A1, a road finisher is known whose rear section can be lifted for paving thick layers. This is achieved by providing a vertical guidance, which can be adjusted in height by means of a hydraulic positioning cylinder, between a crawler undercarriage and a chassis of the road finisher. At the front, the chassis is rotatably mounted on the crawler undercarriage. A disadvantage of this system is the high loads on the hydraulic positioning cylinders, which essentially carry the weight of the lifted chassis completely. Therefore, stability of the road finisher also suffers.

Other road finishers with a chassis that can be lifted at least in a rear area are known from U.S. Pat. Nos. 4,801,218 A and 3,901,616 A. Also, here high forces act on hydraulic positioning cylinders, which carry the weight of the chassis essentially completely.

From the brochure "CR600 SERIES PAVERS & MTV" from BOMAG, a further system for lifting the chassis in relation to the undercarriage in the rear area of a road finisher is known under the designation "Frame Raise System". In this system, a large circular disc is arranged vertically at the chassis in the paving direction of the road finisher. The disc is rotatably mounted at the chassis along its circumference. The disc can thus be rotated around a main axis of rotation running through its center and transverse to the traveling direction of the road finisher. Eccentrically to the main axis of rotation, a connection to the road finisher's undercarriage is provided on an outer surface of the disc which can be rotated about a side axis transverse to the paving direction. The disc can be rotated in its support at the chassis by means of a hydraulic cylinder. When the disc is rotated, the eccentricity of the connection between the disc and the undercarriage changes the mutual height relationship between the chassis and the undercarriage at the rear of the road finisher. Although the weight of the chassis no longer has to be borne entirely by the hydraulic cylinder, this system still has to apply high forces to rotate the disc when lifting the chassis. Also, when holding the chassis in a certain height position, high loads are applied to the hydraulic cylinder.

SUMMARY

It is an object of the disclosure to provide a road finisher with an improved lifting mechanism to lift the chassis of the road finisher relative to the undercarriage in a rear region of the road finisher.

A road finisher according to the disclosure comprises an undercarriage and a chassis supported by the undercarriage. A road finisher according to the disclosure may comprise an undercarriage designed as a crawler track. However, it would also be conceivable to apply the disclosure to a road finisher with a wheeled undercarriage. With regard to a paving direction at the front of the road finisher, a hopper is provided at the chassis to accommodate paving material. With regard to the paving direction at the rear of the road finisher, a paving screed for compacting paving material is mounted, in particular articulated, at the chassis by traction bars.

The road finisher also includes a lifting device adapted to lift the chassis in relation to the undercarriage at least in a rear region of the road finisher. The lifting device comprises a rocker. The rocker is mounted at an undercarriage-side bearing surface (a bearing surface which is part of the undercarriage or at least firmly connected to the undercarriage) so that it can rotate about an undercarriage rotation axis. In addition, the rocker is mounted at a chassis-side bearing surface (a bearing surface which is part of the chassis or at least firmly connected to the chassis) so that it can rotate about a chassis rotation axis. Preferably, the undercarriage rotation axis and the chassis rotation axis are parallel to each other and each run in particular in a horizontal plane and perpendicular to the direction of paving, i.e., in a transverse direction of the road finisher. In particular, the undercarriage rotation axis and the chassis rotation axis are not identical. Preferably, the undercarriage rotation axis and the chassis pivot axis are offset parallel to each other.

The lifting device also includes a length-variable adjustment element. The length-variable adjustment element connects a chassis-side link point (a link point which is part of the chassis or at least fixed to the chassis) to a rocker-side link point (a link point which is part of the rocker or at least fixed to the rocker). In particular, the length-variable adjustment element is hinged to the chassis-side link point and the rocker-side link point. Preferably a first end of the length-variable adjustment element is hinged to the chassis-side link point and a second end of the length-variable adjustment element is hinged to the rocker-side link point. However, it is also conceivable that the length-variable adjustment element may extend beyond the respective link point on one or both sides. The length-variable adjustment element is configured to change the distance between the chassis-side link point and the rocker-side link point by changing its length, thus selectively lifting or lowering the chassis relative to the undercarriage.

In the following, the distance between two axes or between an axis and a bearing surface can be defined as the respective minimum distance.

According to the disclosure, a distance between the chassis rotation axis and the undercarriage rotation axis is greater than a distance between the chassis rotation axis and the chassis-side bearing surface. This can mean that the undercarriage rotation axis is outside the rocker bearing on the chassis. This can result in improved power transmission when lifting or holding the chassis. In addition, the lifting device can be designed to be compact.

Preferably, the length-variable adjustment element is configured to change the position of the rocker relative to the undercarriage or chassis by changing its length. This means that the position of the rocker can be used to provide clearly defined operating states, which can be set as discrete settings, for example, especially if the lifting device allows the height of the chassis to be steplessly adjusted in relation to the undercarriage.

Preferably, the ratio of the absolute value of the part of the connection vector between the rocker-side link point and the undercarriage rotation axis perpendicular to the longitudinal extension direction of the length-variable adjustment element to the absolute value of the part of the connection vector between the undercarriage rotation axis and the chassis rotation axis extending in a horizontal direction is greater than 0.5, 0.7, 1, 1.3, 1.5 or 2. Due to a leverage effect, a particularly good power transmission is achieved when lifting or holding the chassis by means of the length-variable adjustment element. In particular, the ratio described can exceed one of the specified limits over the entire adjustment range of the chassis height. However, it can also be sufficient if this is the case in a maximum lowered or a maximum lifted state of the chassis or at least in an intermediate lifted state of the chassis.

The length-variable adjustment element preferably extends at least substantially along a horizontal direction. Thus, the weight of the chassis acting at least essentially along a vertical direction is at least partially taken up by the rocker or the chassis-side and undercarriage-side bearing surfaces and does not have to be completely borne by the length-variable adjustment element. This contributes to the stability of the entire arrangement. The fact that the length-variable adjustment element extends at least substantially along a horizontal direction may mean that a horizontal component of the direction of extension of the length-variable adjustment element is greater than a vertical component of the direction of extension of the length-variable adjustment element, and/or that an angle of inclination between the length-variable adjustment element and a horizontal plane does not exceed 10°, 15°, 25° or 45°.

Preferably, at least in some operating positions the chassis-side link point is located in front of or behind the chassis rotation axis and/or the undercarriage rotation axis in relation to the direction of paving. Good power transmission can thus be achieved due to a leverage effect.

A lower abutment can be provided at the chassis, which is configured to secure the chassis against further lowering by engaging the rocker when the chassis is in a maximum lowered state. This relieves the load on the length-variable adjustment element when the chassis is in its maximum lowered state. In addition, the maximum lowered state of the chassis is firmly defined by the abutment. The lower abutment also serves as a safety device in the event of a malfunction of the lifting device.

An upper abutment can be provided at the chassis, which is configured to secure the chassis against further lifting by engaging the rocker when the chassis is in a maximum lifted state. Such an upper abutment serves as a safety device against overturning of the lifting device.

The length-variable adjustment element may be a hydraulic cylinder. A hydraulic cylinder can be easily integrated into a hydraulic system usually provided on a road finisher and allows large forces to be transferred. Alternatively, the length-variable adjustment element could also be a spindle drive. This could provide a purely mechanical solution.

The chassis can be pivotally attached to the undercarriage in the front region of the road finisher so that there is no tension between the chassis and the undercarriage when the chassis is lifted asymmetrically along the paving direction.

To avoid tensions, the chassis can be mounted at the undercarriage in a front region of the road finisher such that it can be displaced longitudinally in relation to the direction of paving.

Preferably, the road finisher comprises a spreading auger for distributing paving material in front of the paving screed transversely to the direction of travel. The road finisher can also be equipped with a conveyor device for conveying paving material from the hopper to the spreading auger. The spreading auger can be fixed to the chassis in a fixed position relative to the chassis. Since the chassis can be lifted in relation to the undercarriage as a whole, it is not necessary to adjust the height of the spreading auger in relation to the chassis, thus achieving greater stability. Lifting the chassis with the spreading auger attached to it as a whole does not alter the spatial relationship between the spreading auger and a material outlet of the conveyor device. There is no blocking of the material outlet when the chassis is lifted to achieve high paving thicknesses.

Preferably, the road finisher comprises a locking element configured to mechanically lock the rocker in a defined relative position to the chassis. In the defined relative position, the chassis is preferably at a predefined transport height. Mechanical locking of the chassis at the transport height is particularly useful for transporting the road finisher between construction sites, as the length-variable adjustment element is relieved and the chassis is secured. If the chassis is at the transport height, a maximum height of the road finisher preferably does not exceed a height of 4 m or 3 m. In this case, the roof of the main control station may or may not be folded down. The locking element can be a locking bolt provided at the chassis, which can be extended for locking engagement with a locking structure such as an opening or recess in the rocker. In particular, the locking element can be extended horizontally, in particular perpendicularly to the paving direction.

The road finisher may comprise a locking element actuator for moving the locking element between a locked state, in which the locking element mechanically locks the chassis at the predefined transport height, and a release state, in which the mechanical locking of the chassis at the transport height is released. The locking element actuator can be controlled by a control device of the road finisher to move the locking element between the locked state and the release state.

The road finisher may include an adjustment element actuator for varying the length of the length-variable adjustment element. Such an adjustment element actuator may be, for example, a hydraulic pump for actuating a hydraulic cylinder or a motor for actuating a spindle drive. The control device may be configured to control the adjustment element actuator to selectively lift or lower the chassis relative to the undercarriage.

Preferably, the road finisher includes a mode selection input device which allows a user to select from one of several operating modes of the road finisher. This makes it easy to adapt the road finisher to a particular operating situation.

A transfer mode can be selected by means of the mode selection input device. The control device may be configured to move the chassis to the transport height by controlling the actuator of the adjustment element when the transfer mode is selected and, after moving the chassis to the transport height, to drive the actuator of the locking element to move the locking element to the locked position. By selecting the transfer mode, the road finisher can easily be brought into a condition suitable for transport between construction sites. When the transfer operating mode is selected, the road finisher can preferably be automatically set to a state where forward and reverse travel is possible (e.g., driving master switch greater than zero).

The control device is preferably configured, in the transfer mode, to limit a driving speed of the road finisher to a predetermined maximum value, such as 25 m/min or less than 25 m/min, until the chassis is locked at transport height, and to release higher driving speeds only after locking. In this way, the load acting on the length-variable adjustment element can be kept within limits.

A setting operating mode can be selected using the mode selection input device. The control device may be configured to automatically bring the locking element into the release state when the setting operating mode is selected. Of course, if the locking element is already in the release position when the setting operating mode is selected, this step is not required. The control device may be configured to adjust the height of the chassis in the setting operating mode by controlling the adjustment element actuator based on user input or an automatic control scheme. The setting operating mode is particularly suitable for moving the road finisher to a start configuration immediately prior to paving.

A paving operating mode may be selected by means of the mode selection input device. The control device may be configured to automatically move the locking element to the release state when the paving mode is selected. Of course, if the locking element is already in the release position when the paving mode is selected, this step is not required. The control device may be configured to adjust the height of the chassis by controlling the actuator of the adjustment element based on user input or an automatic control scheme in the paving mode. The paving operating mode is particularly suitable for use during a paving operation.

Preferably, the control device is configured to adjust the chassis height at a higher adjustment speed in the setting operating mode than in the paving operating mode. This allows the chassis to be quickly moved to the desired starting position in the setting operating mode. In paving mode, on the other hand, the chassis height is only changed slowly so as not to endanger paving quality during paving.

A neutral operating mode can be selected using the mode selection input device. The control device may be configured not to allow the length of the length-variable adjustment element to be changed in the neutral mode. This prevents accidental chassis height adjustment in neutral operating mode.

In the following, the disclosure will be explained in more detail using an embodiment with reference to the attached drawings.

DETAILED DESCRIPTION

Figure 1:
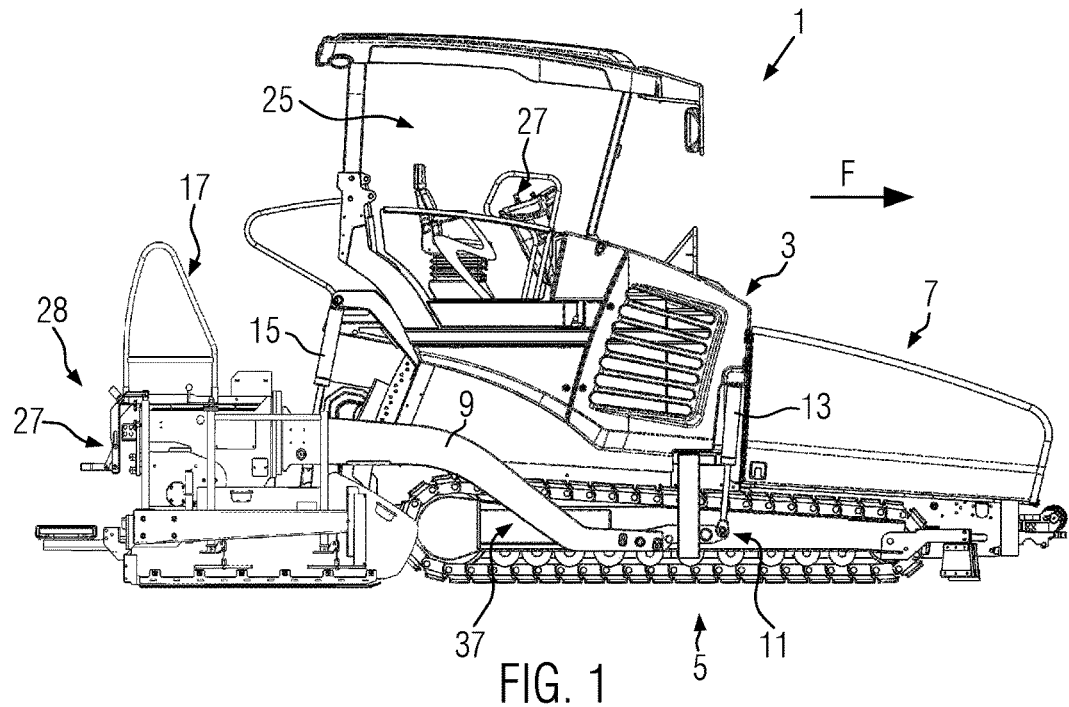
FIG. 1 shows a schematic side view of a road finisher according to an embodiment.

FIG. 1 shows a schematic side view of a road finisher 1 according to the disclosure according to an embodiment. The road finisher 1 comprises a chassis 3 and an undercarriage 5, in this case a crawler track. In paving direction F at the front, a hopper 7 for receiving paving material is fitted at chassis 3. On both lateral sides of road finisher 1, with regard to paving direction F, a pulling arm 9 is mounted on chassis 3 via a height-adjustable link point 11. The link point 11 can be adjusted in height at the road finisher 1 by means of a linkage hydraulic cylinder 13. At the rear of the road finisher 1, the pulling arms 9 are attached to both sides of the chassis 3 via height-adjustable rear hydraulic cylinders 15. A paving screed 17 for compacting paving material is suspended from the rear end of the pulling arms 9 with respect to paving direction F. During paving, the paving screed 17 is pulled by the pulling arms 9 floating on the paving material behind the road finisher 1. In chassis 3, a conveyor device 19 is provided for conveying paving material from hopper 7 to a rear region of the road finisher 1. In the rear region of the road finisher 1, the paving material leaves conveyor device 19 through a material outlet 21 and reaches a spreading auger 23 fixed to the chassis 3 for distributing the paving material in front of paving screed 17 transversely to paving direction F. The spreading auger 23 and the material outlet 21 are concealed in FIG. 1 but shown in FIG. 2. A main control station 25 is provided on the chassis 3 of the road finisher 1, which provides space for an operator and includes an input device 27 for making inputs for controlling the road finisher 1. The road finisher 1 also includes an external operating station 28 provided on paving screed 17, which also includes an input device 27 for making inputs for controlling the road finisher 1.

Figure 2:
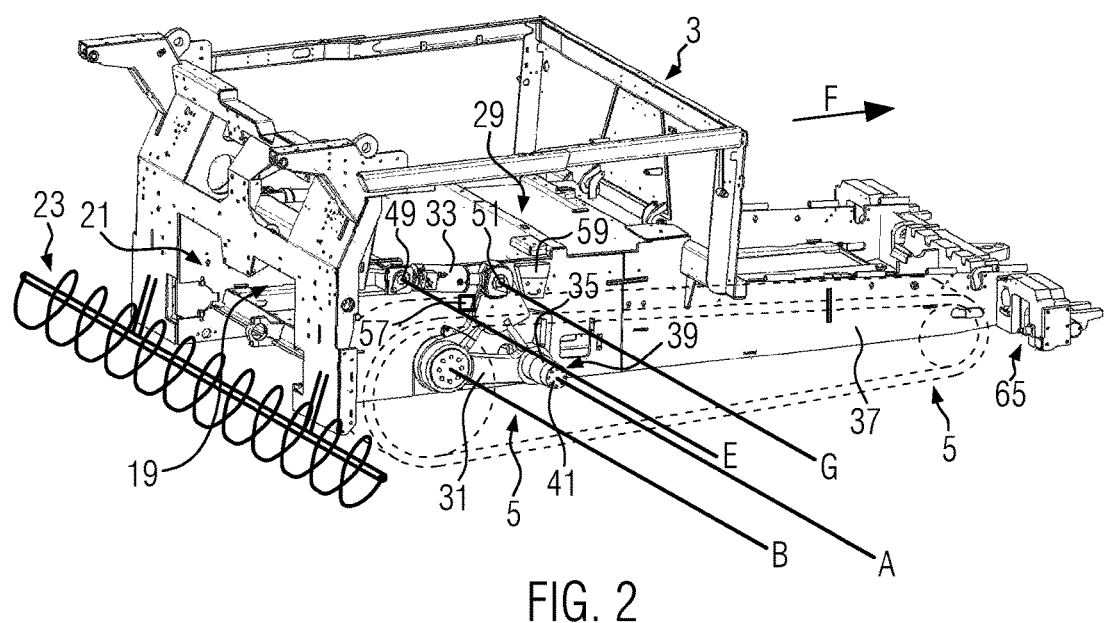
FIG. 2 shows a schematic perspective view of the chassis and the undercarriage of the road finisher according to the embodiment.

FIG. 2 shows a schematic side view of the undercarriage 5 and the chassis 3 of the road finisher 1, whereby for reasons of clarity various superstructures, components and claddings provided on the chassis 3 are not shown. A lifting device 29 for lifting the chassis 3 relative to the undercarriage 5 in the rear region of the road finisher 1 is provided in a rear region of the chassis 3 with respect to the paving direction F. The lifting device 29 comprises a rocker 31 on each of the two lateral sides of the road finisher 1 as well as a length-variable adjustment element 33. In the following, the design and function of the lifting device 29 are described for only one side of the road finisher 1. The opposite side can be of the same design.

The rocker 31 is rotatably mounted around an undercarriage rotation axis A at an undercarriage-side bearing surface 35. As shown in FIG. 2, a track carrier 37 of the undercarriage 5 comprises a cylindrical recess 39, the inner wall of which forms the undercarriage-side bearing surface 35. In the recess 39 a cylindrical extension 41 of the rocker 31 extending along the undercarriage rotation axis A is rotatably accommodated. Alternatively, it would also be conceivable that a corresponding recess would be provided in the rocker 31 and a cylindrical extension of the track carrier 37 would be rotatably accommodated in it about the undercarriage rotation axis A. In this case, the undercarriage-side bearing surface 35 would be formed by the circumferential surface of the extension.

Figure 3:
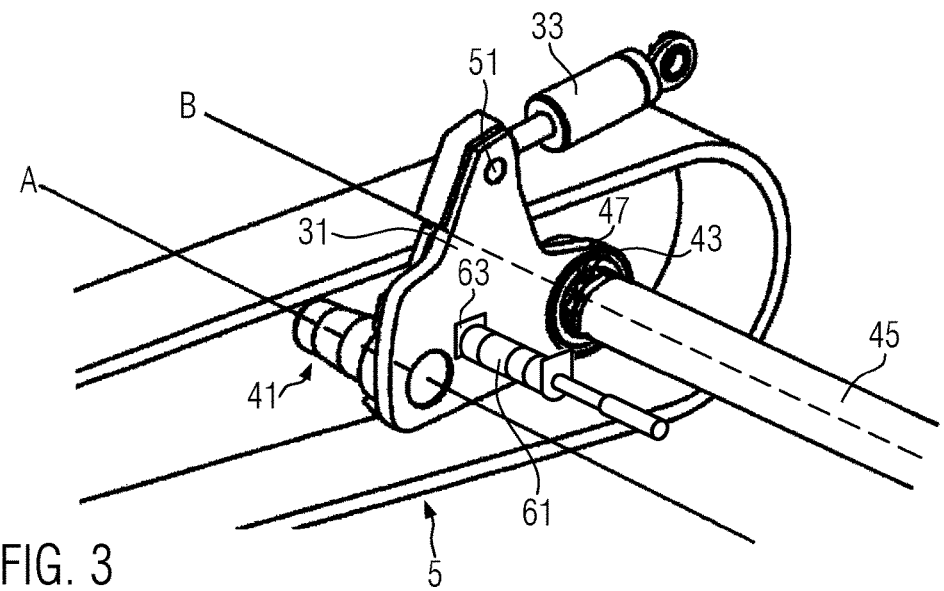
FIG. 3 shows a schematic perspective view of the rocker of a lifting device of the road finisher according to the embodiment.

In addition, the rocker 31 is mounted on a chassis-side bearing surface 43 so that it can rotate about a chassis rotation axis B. As can be seen from the schematic view of the inner surface of the rocker 31, which is not visible in FIG. 2, as shown in FIG. 3, a cylindrical element 45, which is fixed to the chassis 3, is mounted in a corresponding recess 47 of the rocker 31 so that it can rotate about the chassis rotation axis B. The chassis-side bearing surface 43 is provided by an outer circumference of the cylindrical element 45. Alternatively, it would also be conceivable that an extension of the rocker 31 could be mounted in a corresponding recess of a chassis-fixed element so that it could rotate about the chassis rotation axis B. In this case, an inner circumferential surface of the recess would provide the chassis-side bearing surface 43.

The undercarriage rotation axis A and the chassis rotation axis B are parallel to each other and run in a transverse direction perpendicular to the paving direction of travel F.

As shown in FIG. 2, the first end of the length-variable adjustment element 33 is connected to a chassis-side link point 49, so that it can be rotated about a rotation axis E. A second end of the length-variable adjustment element 33 is connected to a rocker-side link point 51 so that it can be rotated about a rotation axis G. The length-variable adjustment element 33 thus connects the chassis-side link point 49 with the rocker-side link point 51. The rotation axis E and the rotation axis G are parallel to each other as well as to the chassis rotation axis A and the undercarriage rotation axis B and run in a transverse direction perpendicular to the paving direction F.

In the illustrated embodiment, the length-variable adjustment element 33 is a hydraulic cylinder. However, it would also be conceivable to provide another length-variable adjustment element 33, such as a spindle drive. The length-variable adjustment element 33 can be actuated by means of an adjustment element actuator 53 to adjust its length steplessly. By changing the length of the length-variable adjustment element 33 by means of the adjustment element actuator 53, a distance between the chassis-side link point 49 and the rocker-side link point 51 is changed. This changes the position of rocker 31 in relation to undercarriage 5 and chassis 3 and thus lifts or lowers chassis 3 in relation to undercarriage 5.

The length-variable adjustment element 33 extends at least essentially along a horizontal direction. In the illustrated embodiment, the chassis-side link point 49 is located behind the chassis rotation axis B and the chassis rotation axis A with respect to the paving direction F. However, it would also be conceivable that the chassis-side link point 49 would be located in front of the chassis rotation axis B and/or the chassis rotation axis A with regard to paving direction F.

Figure 4A:
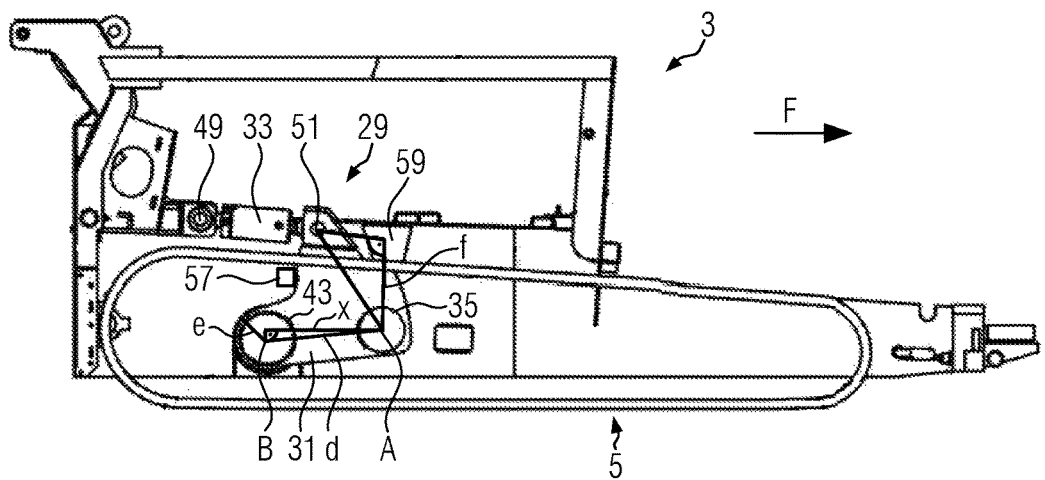
FIG. 4A shows a schematic side view of the undercarriage and chassis of the road finisher according to the embodiment in a maximum lowered position of the chassis.

FIG. 4A shows the chassis 3 in a maximum lowered position compared to the undercarriage 5. In the illustrated embodiment, this corresponds to a minimum length of the length-variable adjustment element 33. In the maximum lowered position of chassis 3 the chassis 3 is secured against further lowering by the engagement of the rocker 31 with a lower abutment 57 provided at chassis 3. If, from the position shown in FIG. 4A, the length of the length-variable adjustment element 33 is increased by means of the adjustment element actuator 53, the distance between the chassis-side link point 49 and the rocker-side link point 51 increases. In the view shown in FIG. 4A, the rocker 31 is rotated clockwise about the undercarriage rotation axis A, which runs into the centre of the drawing plane through the extension 41 of the rocker 31. This lifts the chassis 3 due to the bearing of the rocker 31 on the chassis-side bearing surface 43 which can be rotated around the chassis rotation axis B.

Figure 4B:
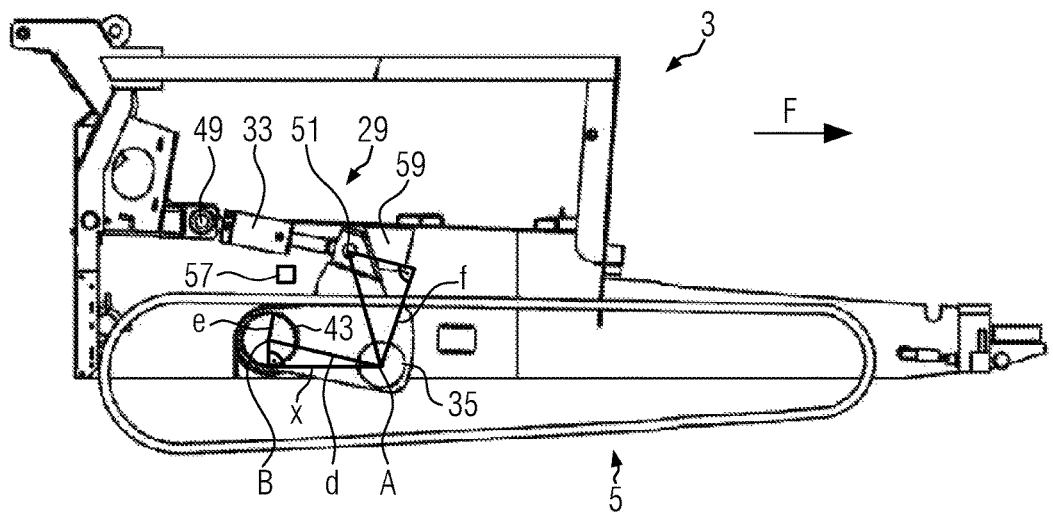
FIG. 4B shows a schematic side view of the undercarriage and chassis of the road finisher according to the embodiment in a maximum lifted position of the chassis.

If the length of the length-variable adjustment element 33 is extended further, the state shown in FIG. 4B is finally achieved. FIG. 4B shows a maximum lifted state of the chassis 3 in relation to the undercarriage 5. In this state the rocker 31 comes into engagement with an upper abutment 59 provided at the chassis 3, which prevents further extension of the length of the length-variable adjustment element 33 and thus further pivoting of the rocker 31 around the undercarriage rotation axis A.

By again reducing the length of the length-variable adjustment element 33, the chassis 3 can be lowered again from the position shown in FIG. 4B. Preferably the height of chassis 3 can be steplessly adjusted between the minimum lifted state and the maximum lifted state by suitable adjustment of the length-variable adjustment element 33. However, it would also be conceivable to provide several discrete adjustment options.

As shown in FIG. 3, a locking element 61 designed as a locking bolt is provided in the illustrated embodiment for mechanically locking the rocker 31 in a defined relative position with respect to the chassis 3. The locking element 61 is provided at the chassis 3 and can be extended laterally in a horizontal plane perpendicular to the paving direction F by means of a locking element actuator 62 in order to engage a locking structure 63 of the rocker 31 in an extended position. In the illustrated embodiment, the locking structure 63 of the rocker 31 is designed as a recess. By locking engagement of the locking element 61 with the locking structure 63 of the rocker 31, the rocker 31 is fixed against changing its relative position in relation to the chassis 3 and the undercarriage 5. In this way, the chassis 3 can be mechanically secured at a predefined height, for example at a transport height for transporting the road finisher 1 between construction sites. If the chassis 3 is at the transport height, it is preferable that a maximum height of the road finisher 1 does not exceed 4 m or 3 m. Thereby, the roof of the main control station 25 may be folded down or not folded down.

As shown amongst other things in FIGS. 4A and 4B, a distance d between the chassis rotation axis B and the undercarriage rotation axis A is greater than a distance e between the chassis rotation axis B and the chassis-side bearing surface 43. The undercarriage rotation axis A is therefore outside the bearing of the rocker 31 at the chassis 3. This results in an improved power transmission when lifting the chassis 3. In addition, as can be seen, the lifting device 29 can be designed to be compact.

FIGS. 4A and 4B schematically illustrate the absolute value f of the part of the connection vector between the rocker-side linkage point 51 and the undercarriage rotation axis A which is perpendicular to the longitudinal extension direction of the length-variable adjustment element 33. In addition, the absolute value x of the part of the connection vector between the undercarriage rotation axis A and the chassis rotation axis B extending in a horizontal direction is shown schematically. Preferably, the ratio of these amounts, f/x, is greater than 0.5, than 0.7, than 1, than 1.3, than 1.5 or than 2. Thus, due to a leverage effect, particularly good power transmission is achieved when lifting or holding the chassis 3 by the length-variable adjustment element 33.

Figure 5:
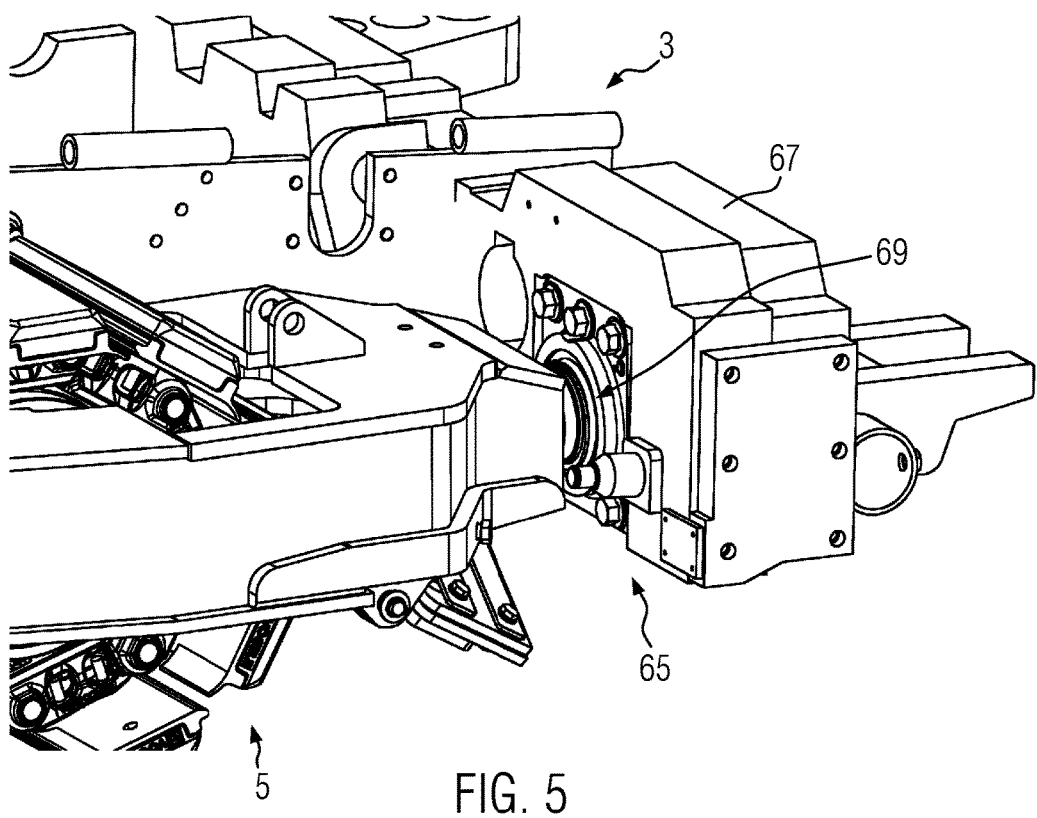
FIG. 5 shows a schematic perspective view of a right-hand connecting area between the undercarriage and the chassis, located at the front of the road finisher in the direction of travel in accordance with the embodiment.

In the illustrated embodiment, chassis 3 is mounted at undercarriage 5 in a front region of road finisher 1 with respect to paving direction F such that it can be pivoted and longitudinally displaced with respect to paving direction F. In this way, chassis 3 can be lifted or lowered in the rear region of the road finisher 1 relative to undercarriage 5 without creating tension in the front region of the road finisher 1. It is possible to lift chassis 3 asymmetrically in such a way that chassis 3 is lifted further in the rear region of the road finisher 1 than in the front region of the road finisher 1. FIG. 5 shows in a sectional schematic side view an attachment region 65 between the undercarriage 5 and the chassis 3 located on the right side of the road finisher 1. On the left side of the road finisher 1 there could be an analogous attachment region 65. The undercarriage 5 can be swivelled and is mounted on a bearing block 67 of chassis 3 so that it can be displaced longitudinally in relation to paving direction F. In particular, undercarriage 5 can be mounted at bearing block 67 by means of a pivoting bearing 69 with integrated sliding bearing.

Figure 6:
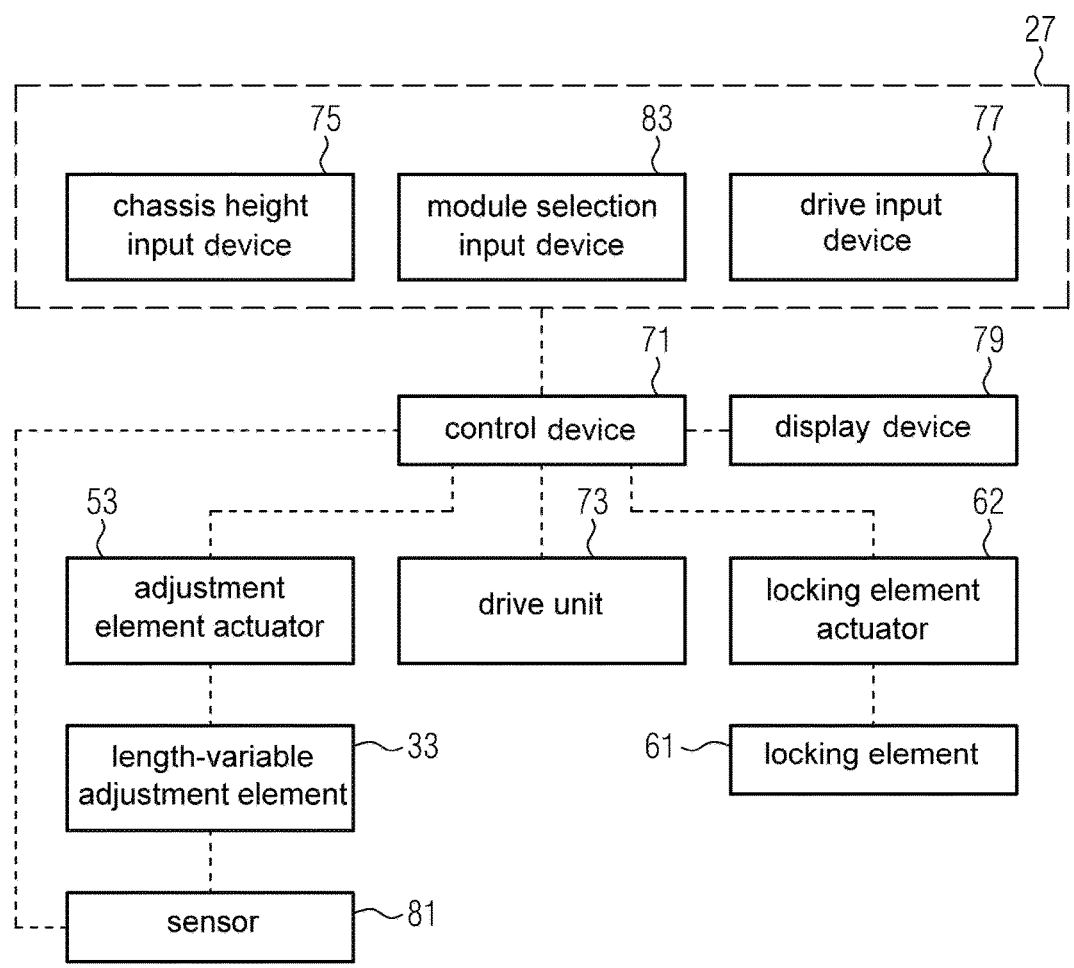
FIG. 6 shows a schematic block diagram showing sections from a control scheme of the road finisher according to the embodiment.

With reference to FIG. 6 control and operation of the lifting device 29 for lifting and lowering the chassis 3 is described in more detail. FIG. 6 shows a block diagram which shows parts of a control scheme of the road finisher 1 of the illustrated embodiment. The road finisher 1 comprises a control device 71 which is adapted to adjust the length of the length-variable adjustment element 33 and thus the height of the chassis 3 relative to the undercarriage 5 by controlling the adjustment element actuator 53. Preferably, the chassis 3 is steplessly height adjustable between the minimum lifted state and the maximum lifted state. It would, either additionally or alternatively, also be conceivable to provide several discrete adjustment options. The control device 71 is also configured to control the locking element actuator 62, in order to selectively move the locking element 61 into the locked state, in which it mechanically locks the rocker 31 in a defined relative position with respect to the chassis 3 corresponding to a transport height of the chassis 3, or into the release state, in which the mechanical locking of the rocker 31 in the defined relative position with respect to the chassis 3 is released. The control device 71 can also be configured to control a drive unit 73 for the driving function of road finisher 1. Of course, also other functions of the road finisher 1 can be controlled by the control device 71.

An operator can transmit function instructions and settings to control device 71 using the input device 27 of the main control station 25.

In particular, the input device 27 can comprise a chassis height input device 75 by means of which the operator can set a desired relative position between the chassis 3 and the undercarriage 5 (height adjustment). It is conceivable that the operator could enter a value corresponding to a specific position of chassis 3 using chassis height input device 75. Alternatively or additionally, it would also be conceivable that the chassis height input device 75 could be used to set the height of chassis 3 by entering a desired change compared to a currently set state.

The input device 27 can also include a drive input device 77, by means of which the operator can set a desired driving speed of the road finisher 1 and preferably also activate or deactivate the driving unit 73 of the road finisher 1.

Preferably, a display device 79, in particular a display, is also provided at the main control station 25, which is controlled by the control device 71 to indicate a current lifting position of chassis 3 relative to undercarriage 5. The control device 71 can receive corresponding data from a sensor 81 which, for example, determines a current length of the length-variable adjustment element 33 or a corresponding value. By means of the display device 79, the operator is always informed about the current operating state of the lifting device 29.

According to a simple embodiment, the control device 71 may be configured to control the adjustment element actuator 53 to change the length of the length-variable adjustment element 33 always directly based on inputs made by the operator via the chassis height input device 75 and/or based on a predefined automatic control scheme. Preferably, however, different operating modes are provided, which can be used depending on the operating situation in order to enable operation of the road finisher 1 to be adapted to the respective situation. For this purpose, the input device 27 may include a mode selection input device 83 by means of which an operator can select a corresponding operating mode.

The operator can select a transfer operating mode using the mode selection input device 83. The transfer operating mode is adapted for moving the road finisher 1 between paving jobs. The control device 71 is configured to bring chassis 3 to the predetermined transport height with respect to undercarriage 5 by appropriately controlling the adjustment actuator 53 when the transfer mode is selected. After moving the chassis 3 to the transport height, the control device 71 controls the locking element actuator 62 to mechanically fix the position of the rocker 31 with respect to the chassis 3, mechanically securing the chassis 3 at the transport height. This ensures that the chassis 3 is adequately secured in its position even at faster driving speeds of the road finisher 1, as can occur during the transfer of the road finisher 1. In the transfer mode, the control device 71 is preferably adapted to limit the driving speed of the road finisher 1 to a predetermined maximum value, for example less than 25 meters per minute, until the chassis 3 is moved to the transport height and the rocker 31 is mechanically secured by means of the locking element 61. Higher travel speeds can then be released. In the transfer mode, the chassis height input device 75 is preferably switched to be ineffective, so that it is not possible to adjust the chassis height from the transport height.

Another operating mode that can be set using the mode selection input device 83 is a setting operating mode. This mode is particularly suitable for positioning and adjusting the road finisher 1 immediately before paving begins, thus bringing it into a suitable starting condition. The control device 71 is configured to automatically set the locking element 61 to the release state (unless the locking element 61 is already in the release state) when the setting operating mode is selected. In addition, the control device 71 is configured to perform height adjustment of the chassis 3 in the setting operating mode by controlling the adjustment element actuator 53 based on user input made by means of chassis height input device 75 or on an automatic control scheme. The height of chassis 3 can be adjusted either while the road finisher 1 is stationary or while driving.

In addition, a paving operating mode can be selected using the mode selection input device 83. The control device 71 is configured to bring the locking element 61 into the release state when the paving mode is selected, at least if the locking element 61 is not already in the release state. The control device 71 is configured to perform, in the paving mode, the height adjustment of chassis 3 with respect to undercarriage 5 by controlling the adjustment element actuator 53 based on user inputs made by means of chassis height input device 75 or on an automatic control or regulation scheme.

Preferably, the control device 71 is configured to adjust the length of the length-variable adjustment element 33 in the setting operating mode at a greater adjustment speed than in the paving operating mode. This allows the road finisher 1 to be quickly ready for use when paving, while the slower adjustment speed prevents a deterioration in road quality due to abrupt adjustments.

A neutral operating mode can also be selected using the mode selection input device 83. In neutral operating mode, the control device 71 does not allow the lifting device 29 to be operated, in particular the length of the length-variable adjustment element 33 cannot be changed.

In addition to or as an alternative to the chassis height input device 75, the mode selection input device 83 and the drive input device 77 of the input device 27 of the main control station 25, a chassis height input device 75, a mode selection input device 83 and a drive input device 77 of corresponding configuration may also be provided at the input device 27 of the external control station 28. It is also possible to provide the display 79 or an additional display 79 on the external control station 28.

What is claimed is:

1. A road finisher comprising
   an undercarriage;
   a chassis;
   a hopper, which is mounted at the chassis at a front of the road finisher with respect to a paving direction for receiving paving material;
   a paving screed provided at a rear of the road finisher with respect to the paving direction for compacting paving material;
   tie bars attaching the paving screed to the chassis; and
   a lifting device configured to lift the chassis relative to the undercarriage at least in a rear region of the road finisher, the lifting device comprising a rocker mounted rotatably about an undercarriage rotation axis on an undercarriage-side bearing surface and rotatably about a chassis rotation axis on a chassis-side bearing surface,
   the lifting device further comprising a length-variable adjustment element connecting a chassis-side link point to a rocker-side link point and configured to change, by changing its length, a distance between the chassis-side link point and the rocker-side link point and thereby selectively lift or lower the chassis relative to the undercarriage,
   wherein a distance between the chassis rotation axis and the undercarriage rotation axis is greater than a distance between the chassis rotation axis and the chassis-side bearing surface.

2. The road finisher according to claim 1 wherein the length-variable adjustment element is configured to change the position of the rocker with respect to the undercarriage and the chassis by changing its length.

3. The road finisher according to claim 1 wherein a ratio of the absolute value of the part of the connection vector between the rocker-side link point and the undercarriage rotation axis perpendicular to the longitudinal extension direction of the length-variable adjustment element to the absolute value of the part of the connection vector between the undercarriage rotation axis and the chassis rotation axis extending in a horizontal direction is greater than 0.5.

4. The road finisher according to claim 1 wherein a ratio of the absolute value of the part of the connection vector between the rocker-side link point and the undercarriage rotation axis perpendicular to the longitudinal extension direction of the length-variable adjustment element to the absolute value of the part of the connection vector between the undercarriage rotation axis and the chassis rotation axis extending in a horizontal direction is greater than 2.

5. The road finisher according to claim 1 wherein the length-variable adjustment element extends at least substantially along a horizontal direction.

6. The road finisher according to claim 1 wherein the chassis-side link point lies in front of or behind the chassis rotation axis and/or the undercarriage rotation axis with respect to the paving direction.

7. The road finisher according to claim 1 wherein a lower abutment is disposed at the chassis, the lower abutment configured to secure the chassis against further lowering by engagement with the rocker in a maximum lowered state of the chassis.

8. The road finisher according to claim 1 wherein an upper abutment is disposed at the chassis, the upper abutment configured, in a maximum lifted state of the chassis, to secure the chassis against further lifting by engagement with the rocker.

9. The road finisher according to claim 1 wherein the length-variable adjustment element is a hydraulic cylinder or a spindle drive.

10. The road finisher according to claim 1 wherein the chassis is pivotably mounted at the undercarriage in a front region of the road finisher.

11. The road finisher according to claim 1 wherein the chassis is mounted at the undercarriage in a front region of the road finisher so as to be longitudinally displaceable with respect to the paving direction.

12. The road finisher according to claim 1 further comprising a spreading auger for distributing paving material in front of the paving screed transversely to the paving direction and a conveying device for conveying paving material from the hopper to the spreading auger, the spreading auger fixedly attached to the chassis.

13. The road finisher according to claim 1 further comprising a spreading auger for distributing paving material in front of the paving screed transversely to the paving direction and a conveying device for conveying paving material from the hopper to the spreading auger, the spreading auger fixedly attached to the chassis in an unchangeable relative position to the chassis.

14. The road finisher according to claim 1, further comprising:
   a locking element configured to mechanically lock the rocker in a defined relative position with respect to the chassis in which the chassis is at a predefined transport height;
   a locking element actuator for moving the locking element between a locked state in which the locking element mechanically locks the chassis at the predefined transport height and a release state in which the mechanical locking of the chassis at the predefined transport height is released; and a control device configured to drive the locking element actuator for moving the locking element between the locked state and the release state.

15. The road finisher according to claim 14 further comprising:

an adjustment element actuator for changing the length of the length-variable adjustment element, wherein the control device is configured to control the adjustment element actuator to selectively lift or lower the chassis relative to the chassis; and a mode selection input device by which a user can select from one of a plurality of operating modes of the road finisher.

16. The road finisher according to claim 15 wherein a setting operating mode is selectable by the mode selection input device, wherein the control device is configured to automatically bring the locking element into the release state when the setting operating mode is selected, and in the setting operating mode to perform height adjustment of the chassis by controlling the adjustment element actuator based on user inputs or an automatic control scheme.

17. The road finisher according to claim 15 wherein a transfer operating mode is selectable by the mode selection input device, wherein the control device is configured to bring the chassis to the predefined transport height by controlling the adjustment element actuator when the transfer operating mode is selected and, after bringing the chassis to the predefined transport height, to control the locking element actuator to move the locking element to the locked position.

18. The road finisher according to claim 17 wherein the control device is configured to limit a driving speed of the road finisher to a predetermined maximum value in the transfer operating mode until the chassis is locked at the predefined transport height, and then to release a higher travel speed.

19. The road finisher according to claim 16 wherein the control device is configured to adjust the chassis height in the setting operating mode at a higher adjustment speed than in the paving operating mode.

20. The road finisher according to claim 15 wherein a paving operating mode is selectable by the mode selection input device, wherein the control device is configured to automatically bring the locking element into the release state when the paving operation mode is selected, and in the paving operating mode to perform a height adjustment of the chassis by driving the adjustment element actuator based on user inputs or an automatic control scheme.

* * * * *